US012585067B2

(12) United States Patent
Geens et al.

(10) Patent No.:    US 12,585,067 B2
(45) Date of Patent:        Mar. 24, 2026

(54) CABLE MANAGEMENT ARRANGEMENT

(71) Applicant: COMMSCOPE CONNECTIVITY BELGIUM BVBA, Kessel-Lo (BE)

(72) Inventors: Johan Geens, Bunsbeek (BE); Pieter Vermeulen, Westerlo (BE); Bart Vos, Geel (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 18/594,669

(22) Filed: Mar. 4, 2024

(65) Prior Publication Data

US 2024/0353626 A1      Oct. 24, 2024

Related U.S. Application Data

(63) Continuation of application No. 17/738,957, filed on May 6, 2022, now Pat. No. 11,921,327, which is a
(Continued)

(51) Int. Cl.
| | |
|---|---|
| *G02B 6/36* | (2006.01) |
| *G02B 6/44* | (2006.01) |
| *H04B 10/25* | (2013.01) |

(52) U.S. Cl.
CPC ........... *G02B 6/3608* (2013.01); *G02B 6/444* (2013.01); *G02B 6/4453* (2013.01); *G02B 6/4454* (2013.01); *H04B 10/25* (2013.01)

(58) Field of Classification Search
CPC .... G02B 6/3608; G02B 6/3885; G02B 6/444; G02B 6/4453; G02B 6/4454
See application file for complete search history.

(56) References Cited

U.S. PATENT DOCUMENTS

| | | | |
|---|---|---|---|
| 3,777,154 | A | 12/1973 | Lindsey |
| 4,154,977 | A | 5/1979 | Verma |
| | | (Continued) | |

FOREIGN PATENT DOCUMENTS

| | | |
|---|---|---|
| CN | 87108065 | 10/1988 |
| CN | 85105477 | 6/1990 |
| | (Continued) | |

OTHER PUBLICATIONS

International Search Report and Written Opinion of the International Searching Authority for International Patent Application No. PCT/EP2017/050530 mailed Mar. 31, 2017, 17 pages.
(Continued)

*Primary Examiner* — Rhonda S Peace
(74) *Attorney, Agent, or Firm* — Merchant & Gould P.C.

(57)        ABSTRACT

A cable management arrangement (1000) is disclosed. In one aspect, a plurality of cables (1002) extending between first and second ends is provided. The arrangement (1000) can also include a supporting sheet (1004) having a first side and a second side, wherein the plurality of cables (1002) is removably adhered to the supporting sheet first side by a first adhesive (1010). A second adhesive (1012) can be provided on at least a portion of the supporting sheet second side and a protection sheet (1014) can be provided to cover the second adhesive (1012). A protection sheet (1014) can be provided that is removable from the supporting sheet (1004) to allow the supporting sheet (1004) to be adhered to a surface. A telecommunications arrangement is also disclosed in which the aforementioned cable management arrangement (1000) is mounted to a telecommunications tray (112) via the second adhesive (1012).

20 Claims, 16 Drawing Sheets

Related U.S. Application Data continuation of application No. 16/983,377, filed on Aug. 3, 2020, now Pat. No. 11,327,239, which is a continuation of application No. 16/069,831, filed as application No. PCT/EP2017/050530 on Jan. 12, 2017, now Pat. No. 10,732,356.

(60) Provisional application No. 62/286,101, filed on Jan. 22, 2016, provisional application No. 62/277,774, filed on Jan. 12, 2016.

(56) References Cited

U.S. PATENT DOCUMENTS

| | | | | |
|---|---|---|---|---|
| 4,625,074 | A | 11/1986 | Cox | |
| 4,753,509 | A | 6/1988 | Parstorfer | |
| 5,155,785 | A * | 10/1992 | Holland | G02B 6/3608 |
| | | | | 156/158 |
| 5,204,925 | A | 4/1993 | Bonanni et al. | |
| 5,327,513 | A | 7/1994 | Nguyen et al. | |
| 5,422,439 | A | 6/1995 | Grove et al. | |
| 5,460,683 | A | 10/1995 | Beasley, Jr. et al. | |
| 5,754,724 | A | 5/1998 | Peterson et al. | |
| 5,902,435 | A | 5/1999 | Meis et al. | |
| 6,229,942 | B1 | 5/2001 | Engberg et al. | |
| 6,352,374 | B1 | 3/2002 | Selfridge et al. | |
| 6,381,396 | B1 * | 4/2002 | Grois | G02B 6/4472 |
| | | | | 385/137 |
| 6,427,034 | B1 | 7/2002 | Meis et al. | |
| 6,442,323 | B1 | 8/2002 | Sorosiak | |
| 6,445,866 | B1 | 9/2002 | Clairadin et al. | |
| 6,554,483 | B1 | 4/2003 | Sun et al. | |
| 6,619,853 | B2 * | 9/2003 | Grois | G02B 6/43 |
| | | | | 385/59 |
| 6,668,129 | B2 | 12/2003 | Kondo et al. | |
| 6,684,020 | B2 | 1/2004 | Wojcik | |
| 6,697,560 | B1 | 2/2004 | Kondo et al. | |
| 6,721,042 | B1 | 4/2004 | Sun et al. | |
| 6,850,671 | B2 | 2/2005 | Carnevale et al. | |
| 6,885,800 | B2 | 4/2005 | Sun et al. | |
| 6,985,667 | B2 | 1/2006 | Arishima et al. | |
| 7,215,865 | B2 | 5/2007 | Bellekens et al. | |
| 7,352,921 | B2 * | 4/2008 | Saito | G02B 6/3608 |
| | | | | 385/14 |
| 8,687,934 | B2 | 4/2014 | Wright et al. | |
| 8,913,857 | B2 | 12/2014 | Chien et al. | |
| 9,223,094 | B2 | 12/2015 | Schneider et al. | |
| 9,494,763 | B2 | 11/2016 | Benner et al. | |
| 9,946,045 | B2 | 4/2018 | Kegerise et al. | |
| 10,379,311 | B1 | 8/2019 | Krywicki et al. | |
| 10,705,306 | B2 * | 7/2020 | Geens | G02B 6/4452 |
| 10,732,356 | B2 * | 8/2020 | Geens | G02B 6/3608 |
| 11,327,239 | B2 * | 5/2022 | Geens | G02B 6/3608 |
| 11,921,327 | B2 * | 3/2024 | Geens | G02B 6/4453 |
| 2002/0015563 | A1 | 2/2002 | Murakami et al. | |
| 2002/0102088 | A1 * | 8/2002 | Kondo | G02B 6/3608 |
| | | | | 385/134 |
| 2002/0131719 | A1 | 9/2002 | Grois et al. | |
| 2003/0072535 | A1 * | 4/2003 | Sun | G02B 6/3608 |
| | | | | 385/59 |
| 2003/0174953 | A1 * | 9/2003 | Carnevale | G02B 6/4472 |
| | | | | 385/39 |
| 2004/0161212 | A1 | 8/2004 | Sun et al. | |
| 2004/0213505 | A1 | 10/2004 | Saito et al. | |
| 2005/0095406 | A1 | 5/2005 | Gunzel et al. | |
| 2009/0147351 | A1 | 6/2009 | Oshita et al. | |
| 2011/0026895 | A1 | 2/2011 | Baum et al. | |
| 2012/0243845 | A1 | 9/2012 | Wright et al. | |
| 2013/0034324 | A1 | 2/2013 | Laing et al. | |
| 2017/0045693 | A1 | 2/2017 | Hodge | |
| 2019/0025521 | A1 | 1/2019 | Geens et al. | |

FOREIGN PATENT DOCUMENTS

| | | | |
|---|---|---|---|
| CN | 1207813 | | 2/1999 |
| CN | 1351718 | | 5/2002 |
| CN | 1494664 | | 5/2004 |
| CN | 1615448 | | 5/2005 |
| CN | 101533130 | | 9/2009 |
| CN | 101790697 | | 7/2010 |
| CN | 101981484 | | 2/2011 |
| CN | 102165351 | | 8/2011 |
| CN | 102474085 | A | 5/2012 |
| CN | 102549467 | | 7/2012 |
| CN | 202330813 | | 7/2012 |
| CN | 103814318 | | 5/2014 |
| CN | 104459920 | | 3/2015 |
| CN | 105086871 | | 11/2015 |
| EP | 863035 | A1 | 9/1998 |
| EP | 1067418 | | 1/2001 |
| GB | 2314940 | A | 1/1998 |
| JP | 2003037628 | | 2/2003 |
| JP | 2003307628 | A | 10/2003 |
| WO | 2011017227 | A2 | 2/2011 |
| WO | 2014134154 | A1 | 9/2014 |
| WO | 2016042018 | A2 | 3/2016 |
| WO | 2016042034 | A1 | 3/2016 |

OTHER PUBLICATIONS

Extended European Search Report for European Patent Application No. 21206209.5 mailed Jun. 2, 2022, 6 pages.

* cited by examiner

CABLE MANAGEMENT ARRANGEMENT

CROSS-REFERENCE TO RELATED APPLICATIONS

This application is a Continuation of U.S. patent application Ser. No. 17/738,957, filed May 6, 2022, now U.S. Pat. No. 11,921,327; which is a Continuation of U.S. patent application Ser. No. 16/983,377, filed Aug. 3, 2020, now U.S. Pat. No. 11,327,239; which is a Continuation of U.S. patent application Ser. No. 16/069,831, filed Jul. 12, 2018, now U.S. Pat. No. 10,732,356; which is a National Stage Application of PCT/EP2017/050530, filed Jan. 12, 2017; which claims the benefit of U.S. Patent Application Ser. No. 62/277,774, filed Jan. 12, 2016, and claims the benefit of U.S. Patent Application Ser. No. 62/286,101, filed Jan. 22, 2016, the disclosures of which are incorporated herein by reference in their entireties. To the extent appropriate, a claim of priority is made to each of the above disclosed applications.

FIELD OF THE INVENTION

The present invention relates to arrangements adapted to manage and control telecommunications and other types of cables in an effective manner.

BACKGROUND

Numerous telecommunications panels exist today and are used in various equipment applications. Conventional telecommunications panels generally include telecommunications cables that are independent routed between telecommunications components. The identification and separation of individual or specific cables can be problematic for these types of installations.

SUMMARY

Cable management arrangements are disclosed in which one or more cables are removably secured to a carrier or support sheet structure. The cables can be arranged in any desired manner and length on the carrier or support sheet structure. In one aspect, the cables are arranged in a coiled or serpentine manner, and can be peeled away from the carrier or support sheet structure. In this manner, an arrangement can be factory produced in which the cables are securely stored on the carrier or sheet and can then be later selectively peeled from the carrier or sheet in the field during installation. Such an approach also ensures that the cables are arranged so that minimum bend radius limitations are maintained. As a result, quality control can be maintained at a high level during factory production. The resulting construction is also easily transportable while maintaining the desired routing and storage patterns.

The carrier or support sheet can be provided with a specifically designed shape to allow for cable routing within an environment, for example within a fiber optic storage tray. In this manner, entire lengths of individual cables do not need to be routed and managed in the field. Rather, an installer can simply place the carrier or support sheet at the desired location, and subsequently remove the necessary length of cable to provide the final connection between the cables and other devices or cables. In some examples, portions of the cables are permanently secured to the carrier or sheet while other portions of the cables can be peeled from the carrier or sheet. For example, the cables may be permanently attached to a zone or portion of the carrier or sheet responsible for routing the cables from one location to another while the cables may be removable from a portion or zone of the carrier or sheet responsible for storing lengths of cable that are intended to be removed such that they can be routed to a different location. As will be further appreciated in the remaining portions of this application, the disclosed arrangements and methods represent a significant advance over approaches requiring individual installation and routing of cables.

The disclosure includes multiple embodiments of cable management arrangements. In one example, at least one cable, or a plurality of cables extending between first and second ends is, provided. The arrangement can also include a supporting sheet having a first side and a second side, wherein the one cable or the plurality of cables is removably adhered to the supporting sheet first side by a first adhesive. A second adhesive can be provided on at least a portion of the supporting sheet second side and a protection sheet can be provided to cover the second adhesive. A protection sheet can be provided that is removable from the supporting sheet to allow the second adhesive to be exposed such that the supporting sheet can be adhered to a surface.

A telecommunications arrangement is also disclosed in which the aforementioned cable management arrangement is mounted to a telecommunications tray, for example a splice tray, via the second adhesive or by a fastener system (e.g. clamping, bolting, clips, slots that receive the support sheet edges, etc.). Multiples of the telecommunications trays can be mounted within a support tray of a support tray assembly that can in turn be mounted within a telecommunications cabinet.

A method of installing telecommunications cables in a telecommunications assembly is also disclosed. The method can include: providing a telecommunications tray having a plurality of cables adhered to a bottom side of the tray that extend to optical connectors; installing the telecommunications tray within a tray assembly having a plurality of adapters; connecting at least some of the adapters to at least some of the connectors; peeling at least a portion of some of the cables from the bottom side of the telecommunications tray and routing the portion to a top side of the telecommunications tray; and connecting the at least some cables to a telecommunications component or splicing one or more of the cables peeled from the sheet to other cables.

An arrangement and method of installing a telecommunications cable is also disclosed. The method can include: providing a telecommunications device having a cable adhered to the device; peeling at least a portion of the cable from the telecommunications device and routing the portion to a telecommunications component or splicing the cable to another cable.

Aspects of the disclosure are directed to a multi-positionable tray assembly for mounting within a chassis of a telecommunications panel. In one aspect, the multi-positionable tray assembly includes a tray and a support arm. The tray is configured to support at least one cable management structure while the support arm is connected to and supports the tray at a pivot joint. This structure allows the tray to be rotatable about the pivot joint at a pivot axis between a folded position and an access position. In some examples, the cables are fiber optic cables. In some examples, one end of the fiber optic cables is connectorized.

BRIEF DESCRIPTION OF THE DRAWINGS

The accompanying drawings, which are incorporated in and constitute a part of the description, illustrate several aspects of the present disclosure. A brief description of the drawings is as follows:

Figure 16:
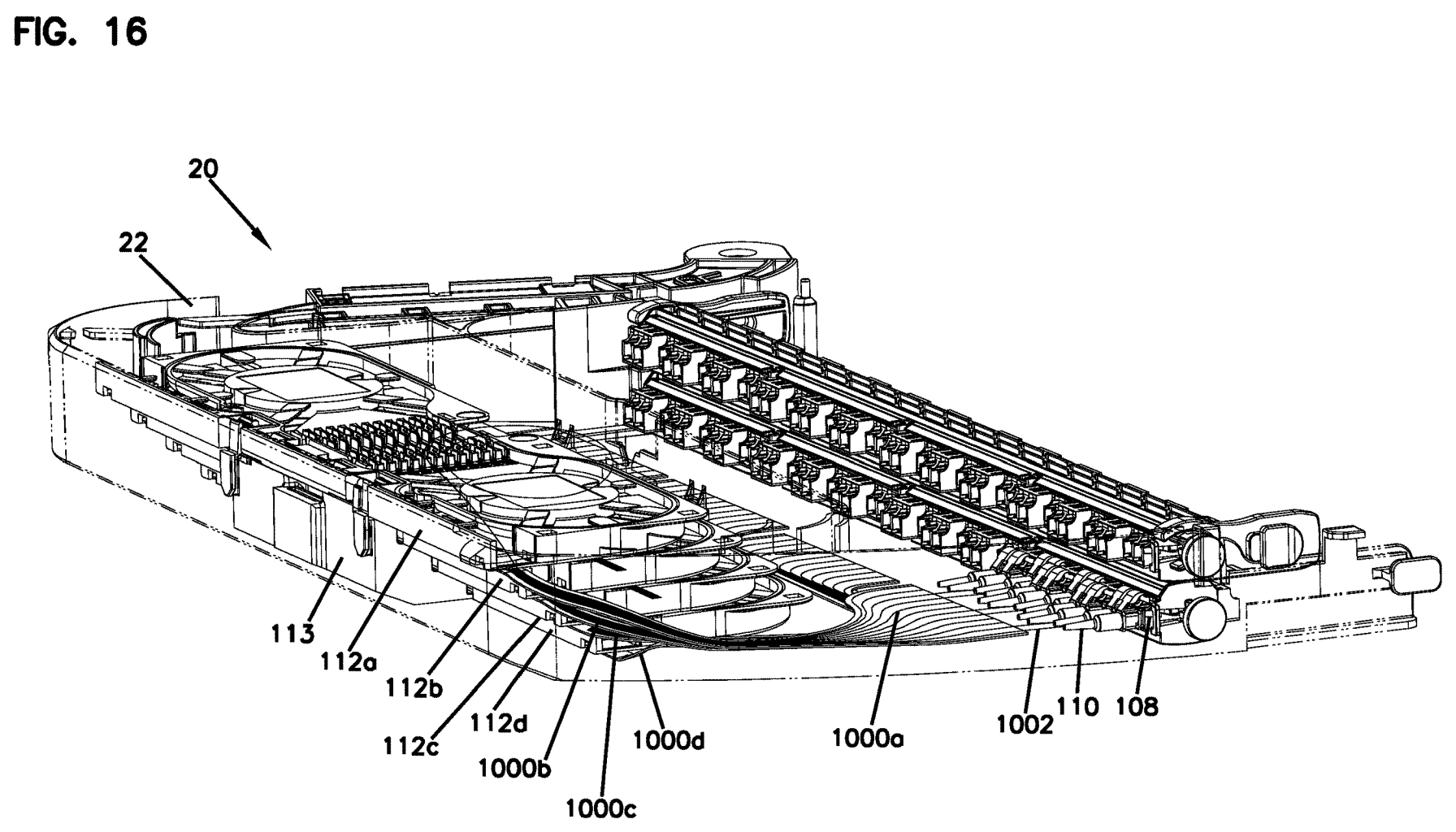

FIG. 16 is a rear perspective view of the tray assembly shown in FIG. 15 with portions of the tray not shown to further illustrate the interior components of the tray assembly.

DETAILED DESCRIPTION

Reference will now be made in detail to exemplary aspects of the present disclosure that are illustrated in the accompanying drawings. Whenever possible, the same reference numbers will be used throughout the drawings to refer to the same or similar parts.

Figure 1:
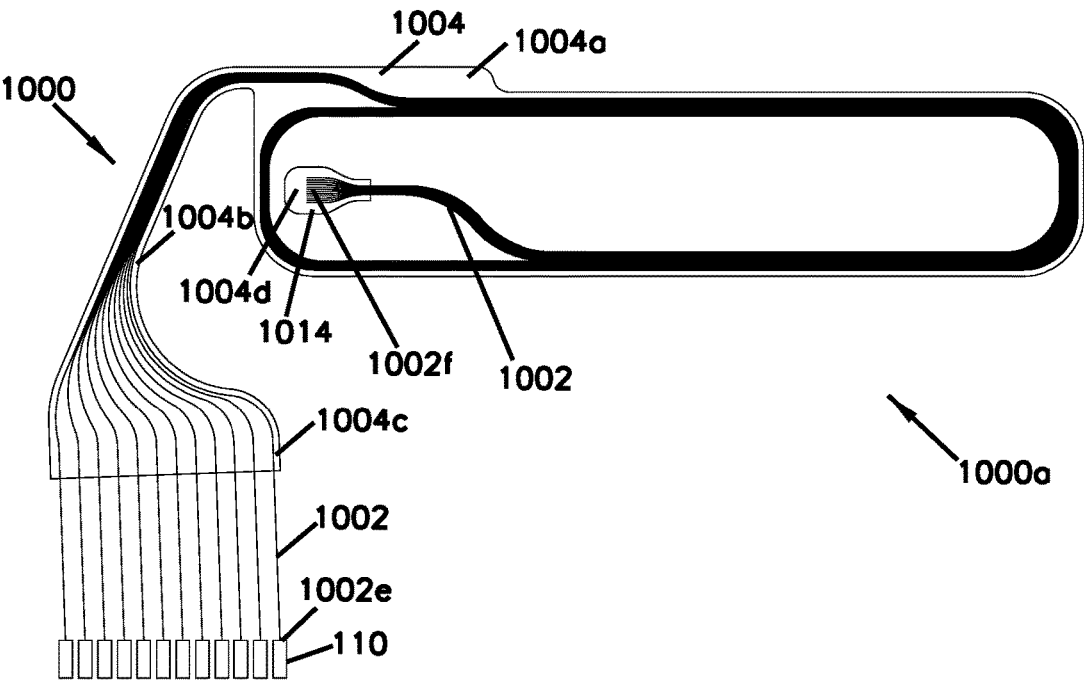
FIG. 1 is a top view of an example cable management arrangement in accordance with principles of the present disclosure.
Figure 2:
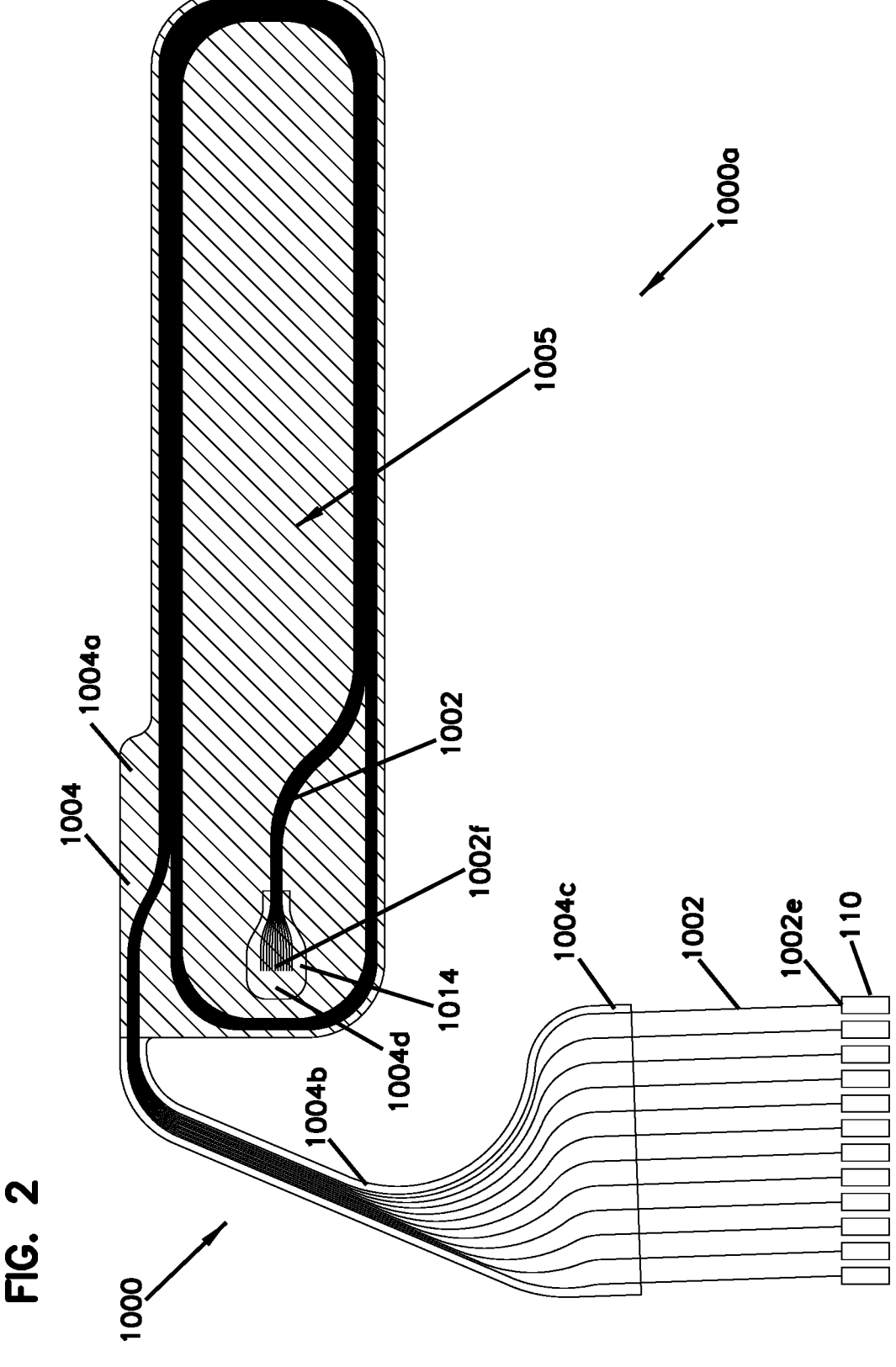
FIG. 2 is a top view of the cable management arrangement shown in FIG. 1 with a peel off area identified on the cable management arrangement.
Figure 3:
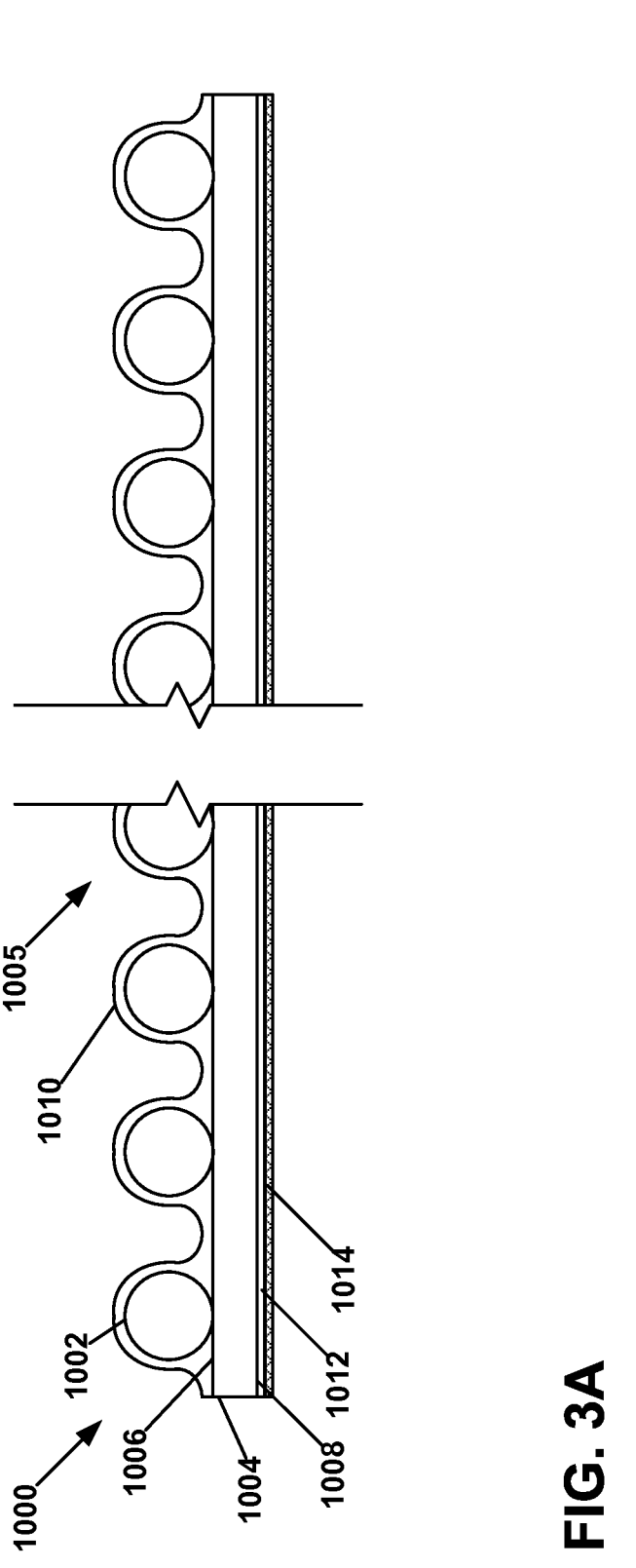
FIG. 3 is an example schematic cross-sectional view of the cable management arrangement shown in FIG. 1 or 1A at a peel off area.

Referring to FIGS. 1 to 3, an example of a cable management arrangement 1000 is presented. The cable management arrangement 1000 is provided to efficiently manage the routing of cables 1002. The cable management arrangement 1000 is shown as including a plurality of cables 1002 adhered or otherwise mounted to a support sheet 1004. In the example shown, 12 cables 1002 are provided. However, more or fewer cables 1002 may be provided, for example any number of cables between 1 and 48 cables 1002. More than 48 cables 1002 may also be provided. The cables 1002 may be any type of cable, for example, power cables and/or telecommunications cables and data cables having a signal conveying member(s), such as optical fibers, copper wire, metal wire, and twisted pair cables. Different types of cables 1002 may also be adhered to the same support sheet 1004 as well, for example, a power cable and a telecommunications cable. One example of a cable 1002 is shown at FIG. 4. As shown, cable 1002 has a jacket 1002*a*, a strengthening layer 1002*b*, an aramid cladding layer 1002*c*, a buffer tube 1002*d*, and a plurality of optical fibers 1003. Referring to FIG. 5, an example of an optical fiber 1003 is shown. As shown, optical fiber 1003*a* has a core 1003*a*, a cladding layer 1003*b*, a coating/acrylate later 1003*c*, and a jacket 1003*d*. In some examples, the cables 1002 are about 250 micrometers in diameter. Many other types of cables are usable with the concepts disclosed herein.

In the example shown, each of the cables 1002 extends between a first end 1002*e* and a second end 1002*f*. The first ends 1002*e* are shown as being provided with connectors 110 which can be, for example, optical type connectors, such as LC type connectors. In one example, the connectors 110 are mounted directly to the sheet 1004. The second ends 1002*f* are shown as being free ends that can be connected to telecommunications components, for example the terminals of an optical splice or splitter tray and/or to connectors.

As most easily seen at FIG. 3, the support sheet 1004 has a first side 1006 and an opposite second side 1008. The support sheet 1004 can be formed from a variety of materials, for example, polymeric or plastic materials and paper-based materials. The support sheet 1004 may be made from any material capable of functioning as a carrier for the cables 1002. Additionally, the support sheet 1004 can be flexible, thereby allowing the sheet 1004 to conform to irregular surfaces and/or to allow the sheet, or portions of the sheet, to be easily routed within an installed environment. In one aspect, the cables 1002 are removably affixed to the first side 1006 of the support sheet 1004. In one example, the cables 1002 are affixed to the first side 1006 by an adhesive 1010, for example a sprayed silicone adhesive or shrink-wrapped foil. In the example shown at FIG. 3, the adhesive 1010 is sprayed or otherwise formed onto the cables 1002 and support sheet first side 1006 after the cables have been oriented as desired on the first side 1006 of the support sheet 1004. In the example shown at FIG. 3, the adhesive 1010 completely covers the cables 1002 such that each cable 1002 must break through the top surface of the adhesive 1010 in order to be separated from the support sheet 1004, as is shown for the cable 1002 at the far right of the figure.

Figure 1A:
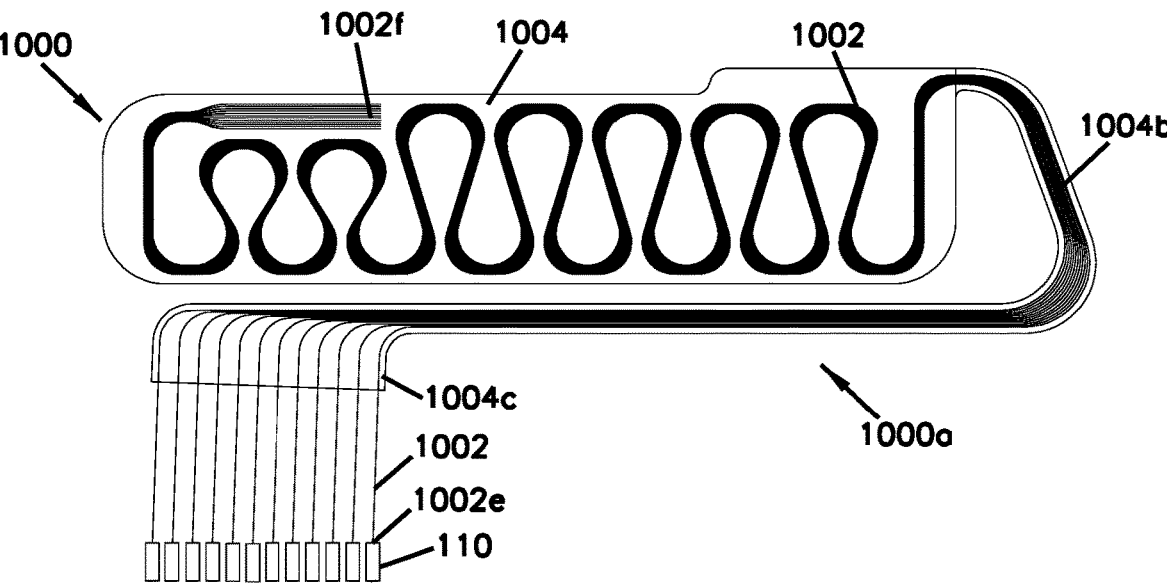
FIG. 1A is a top view of an example cable management arrangement in accordance with principles of the present disclosure.

The support sheet first side 1006 can be provided with a tacky surface such that when the cables 1002 are laid onto the sheet 1004, for example by a dispensing head, the cables 1002 remain sufficiently affixed to the sheet 1004 until the adhesive 1010 can be applied. By using an adhesive 1010 to affix the cables 1002 to the support sheet 1004, it can be completely assured that the cables 1002 are routed such that a minimum radius is always maintained when the cables 1002 must be routed along a curved pathway. Thus, the disclosed system ensures that the cables 1002 are routed and secured in a proper manner to protect the cables 1002 from damage. FIGS. 1 and 1A show example routing paths that could be utilized to maximize the stored length of cable while ensuring minimum bend radii are maintained.

Figure 3A:
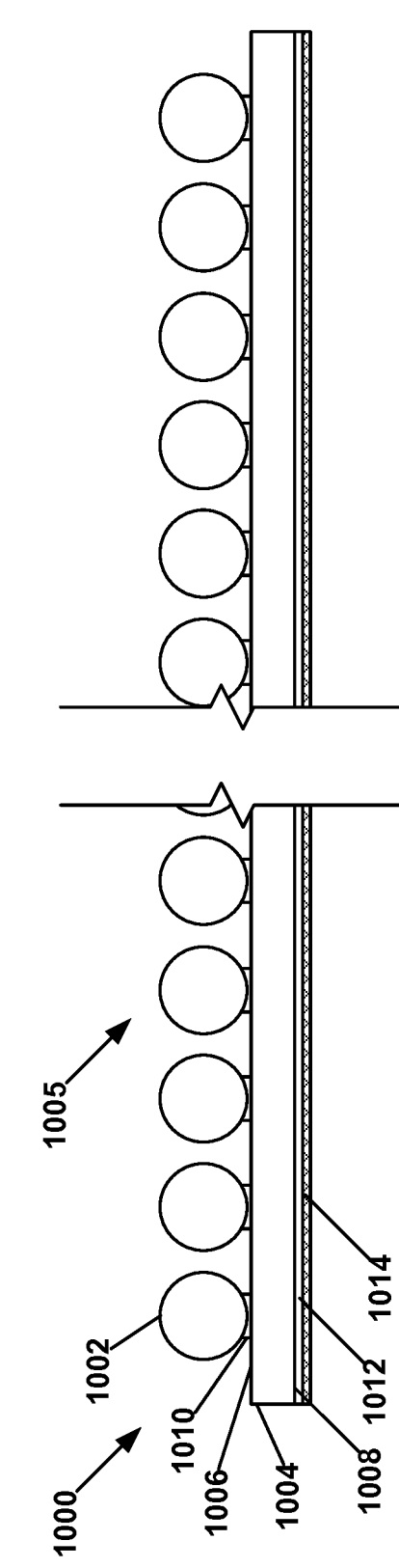
FIG. 3A is an example schematic cross-sectional view of the cable management arrangement shown in FIG. 1 or 1A at a peel off area.
Figures 3B, 4, 5:
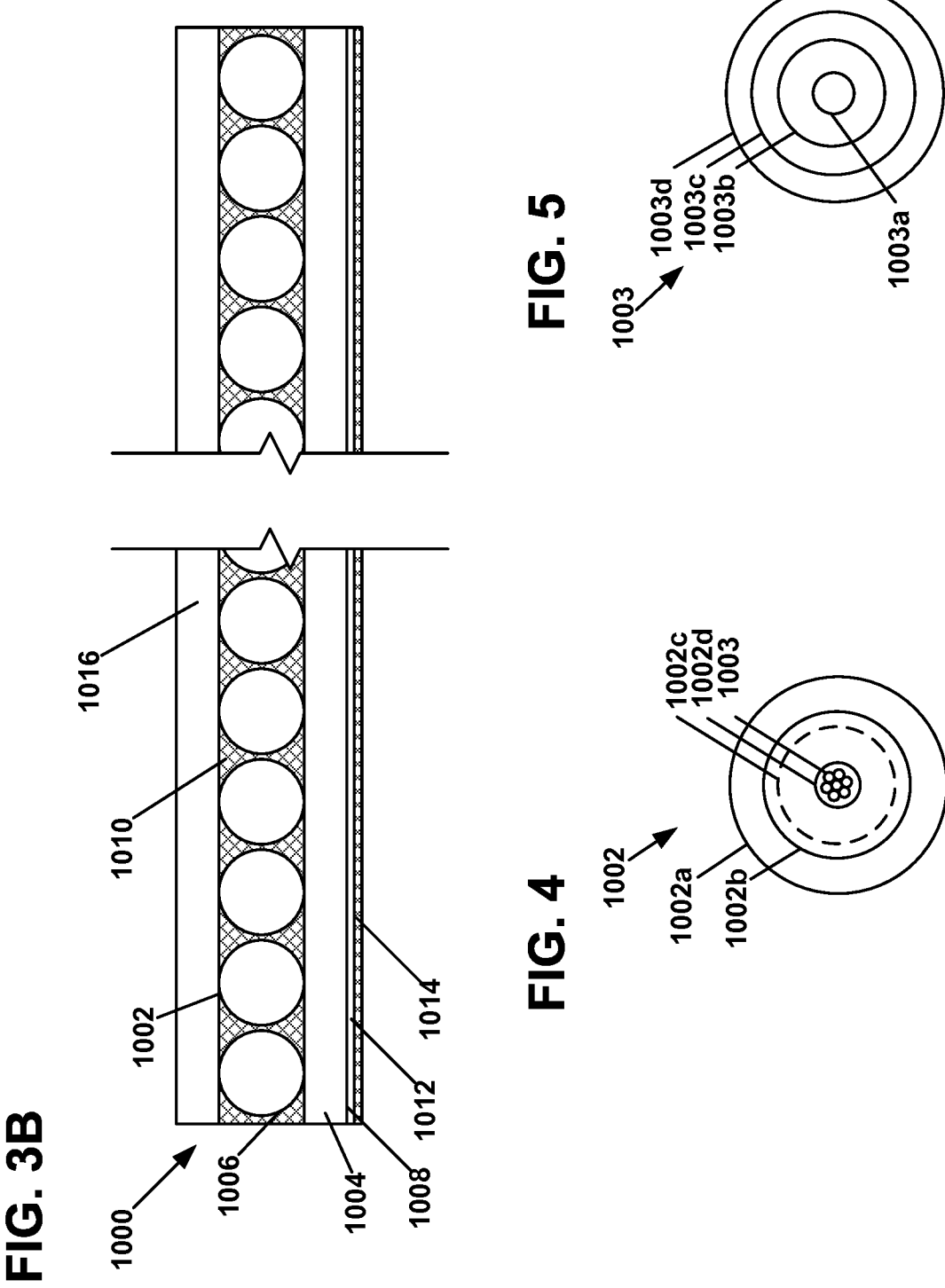
FIG. 3B is an example schematic cross-sectional view of the cable management arrangement shown in FIG. 1 or 1A outside of the peel off area.
FIG. 4 is a schematic cross-sectional view of an example cable usable with the cable management arrangement shown in FIG. 1.
FIG. 5 is a schematic cross-sectional view of an optical fiber of the cable shown in FIG. 4.
Figure 6:
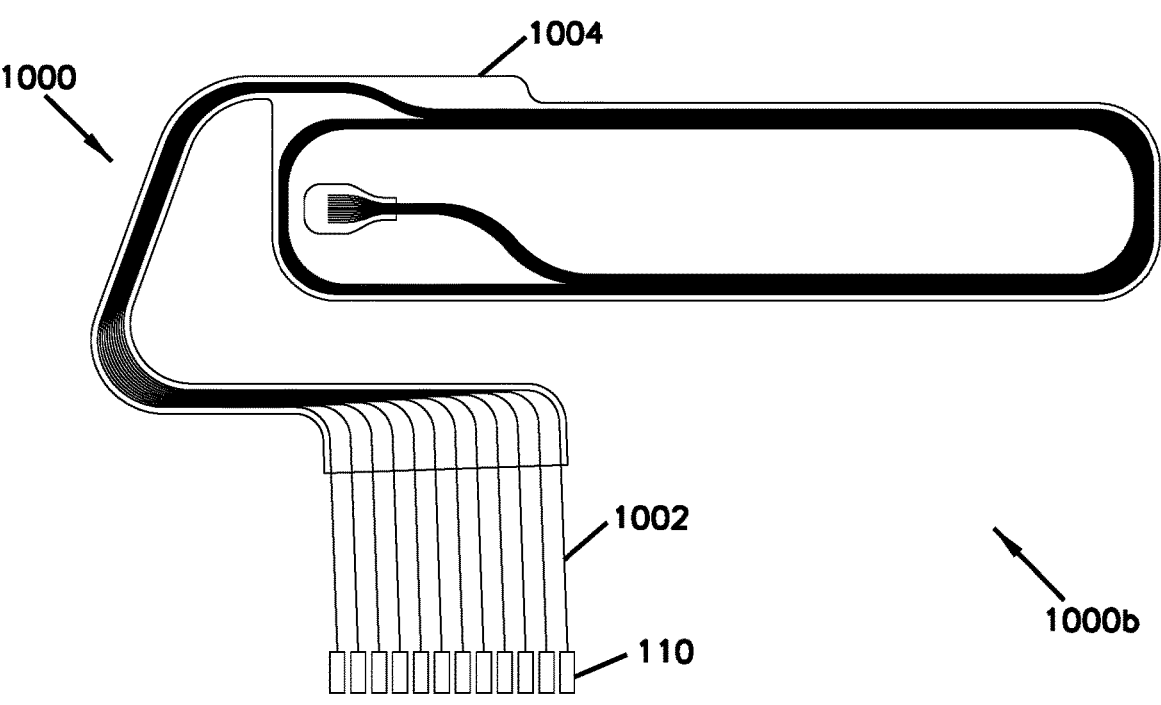
FIG. 6 is a top view of an example cable management arrangement in accordance with principles of the present disclosure.
Figure 7:
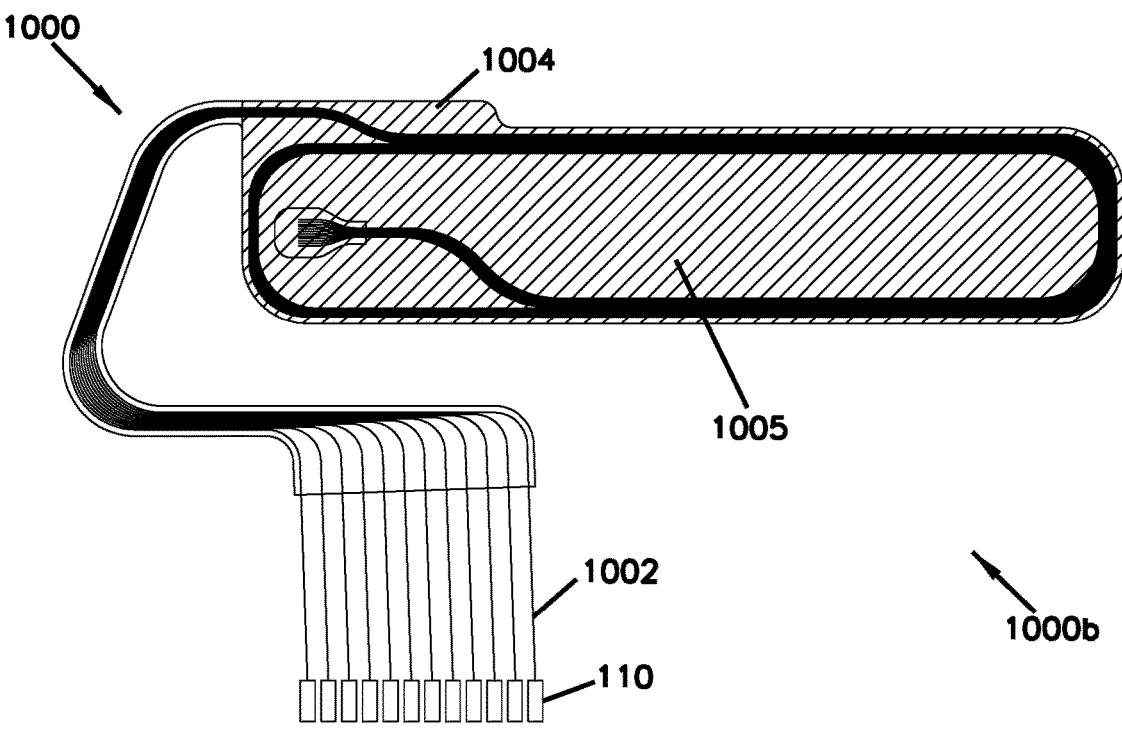
FIG. 7 is a top view of the cable management arrangement shown in FIG. 6 with a peel off area identified on the cable management arrangement.
Figure 8:
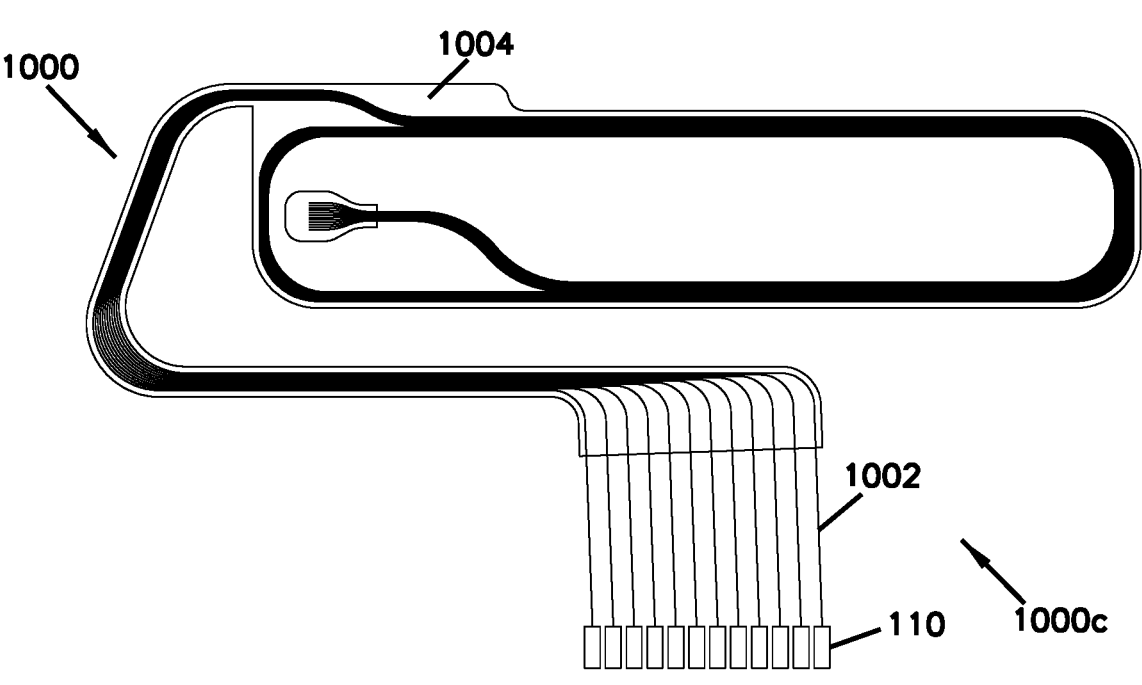
FIG. 8 is a top view of an example cable management arrangement in accordance with principles of the present disclosure.
Figure 9:
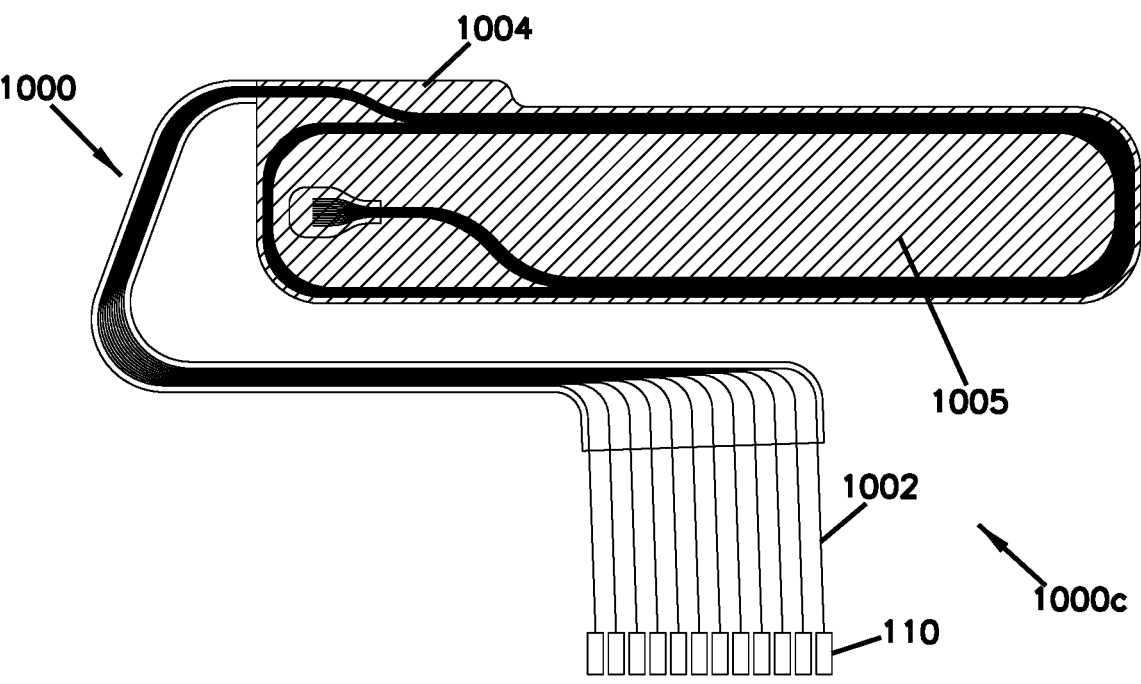
FIG. 9 is a top view of the cable management arrangement shown in FIG. 8 with a peel off area identified on the cable management arrangement.
Figure 10:
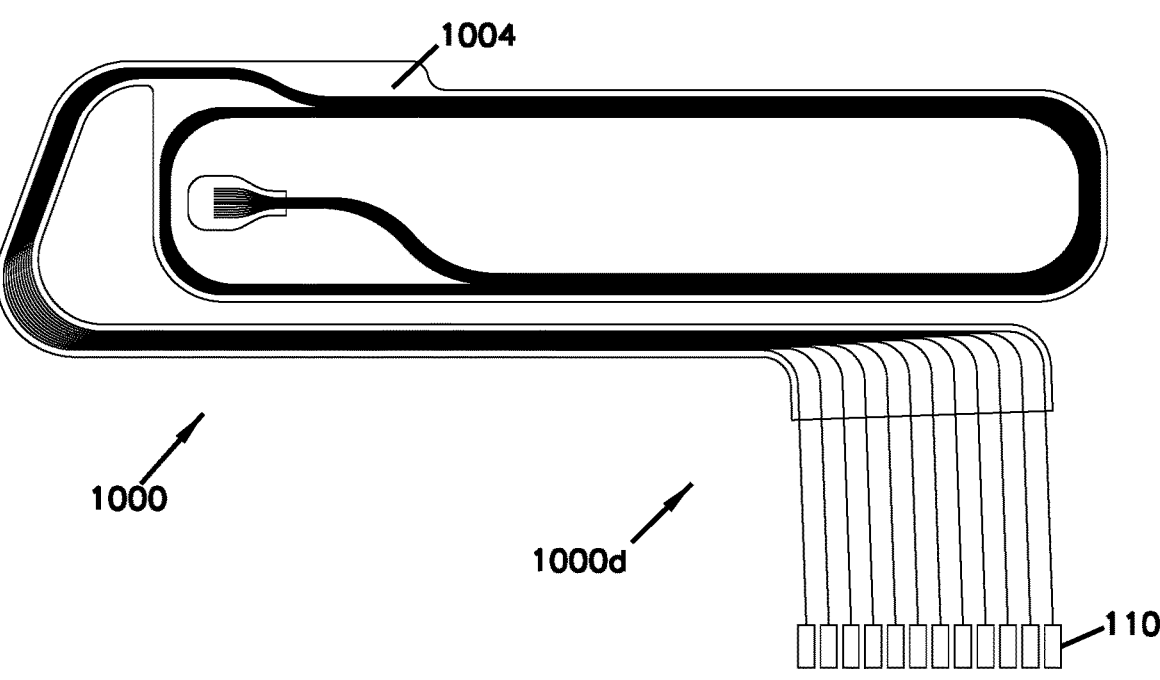
FIG. 10 is a top view of an example cable management arrangement in accordance with principles of the present disclosure.
Figure 11:
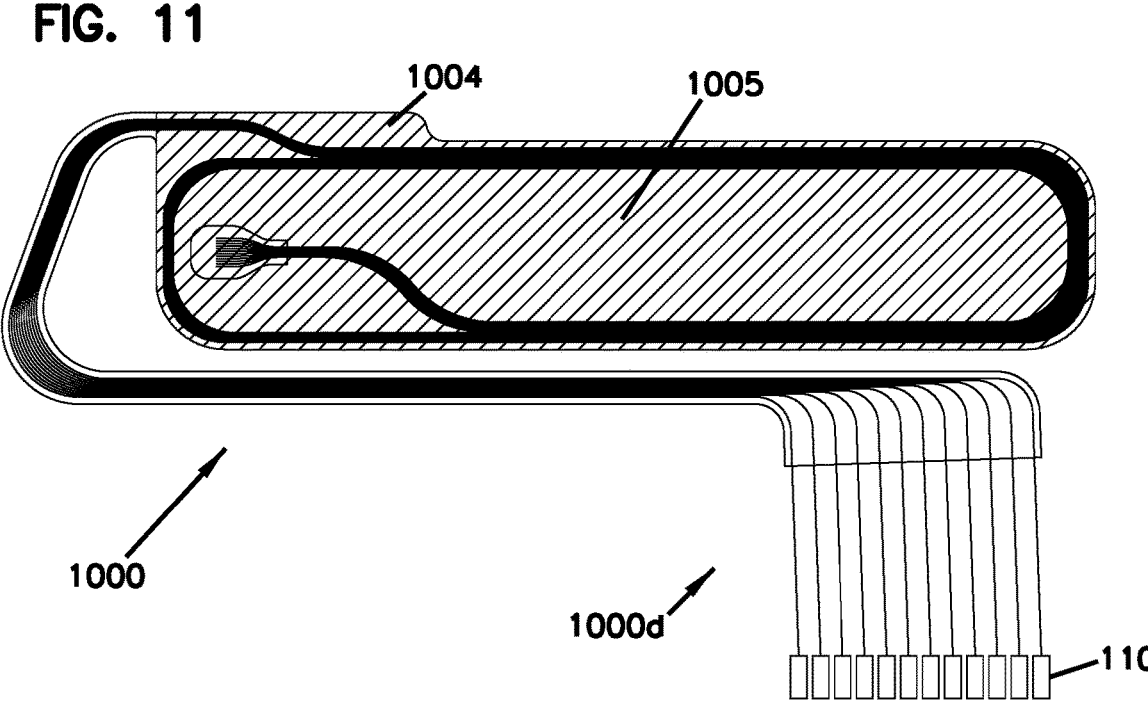
FIG. 11 is a top view of the cable management arrangement shown in FIG. 10 with a peel off area identified on the cable management arrangement.

FIG. 3A shows an alternate arrangement in which the adhesive 1010 is applied between the cables 1002 and the support sheet 1004. In such arrangements, the adhesive 1010 may be applied directly to the support sheet 1004 along a desired routing path for each individual cable 1002. Alternatively, or in addition, the adhesive 1006 may be applied across some or all of the first side 1006 of the support sheet 1004 without defining a desired cable routing pathway. In one example, the adhesive 1010 is applied to the first surface 1006, the cables 1002 are subsequently arranged on the support sheet first side 1006, and the adhesive 1010 cures such that the exposed portions of the adhesive 1010 not covered by cables 1002 no longer have an adhesive quality. In one example, the adhesive is applied to the cables 1002 which are then arranged onto the support sheet first side 1006. The adhesive 1010 can also be utilized to glue the cables 1002 to each other to form a ribbon from which the cables 1002 can be individually peeled either before or after the cables 1002 have been peeled from the support sheet first side 1006.

The second side 1008 of the support sheet 1004 may also be provided with an adhesive 1012. The adhesive 1012 may be any type of adhesive, for example a silicon-based adhesive. The adhesive 1012 may be provided over a portion or the entirety of the second side 1008 of the support sheet 1004. Where not provided over the entire surface, the adhesive 1012 may be provided in a random manner or in a pattern, such as a cross hatching-type pattern or a zig-zag pattern. To protect the adhesive 1012 until the sheet 1004 is ready to be applied to a mounting surface, a protective sheet 1014 may be provided to cover the adhesive 1012. To expose the adhesive 1012, the protective sheet 1014 can be peeled away from the adhesive 1012 and discarded. The protective sheet 1014 can be made from any of a variety of materials known in the art for protecting adhesives, for example coated paper-based materials. The support sheet 1004 can also be provided without an adhesive 1012 and may instead be configured to be mechanically attached to another surface. In some examples, the support sheet 1004 can be held by clips or can engage with slots provided on a structure, for example a tray. The support sheet 1004 may also be provided with apertures through which clips or other mechanical fasteners can extend. The support sheet 1004 can also be configured such that it is a stand-alone storage structure without features allowing the sheet to be secured to another structure.

In one example, the support sheet 1004 can be provided with a specified shape and size to define a desired routing path for the cables 1002. In the embodiment shown, the support sheet 1004 is shaped for installation within a fiber optic support tray 22, wherein the cables 1002 are arranged to extend between a splice tray 112 and the fiber optic adapters 108 of the support tray 22. The support tray 22 and related features are discussed in further detail below. Although an application involving a support tray 22 and splice tray 112 is described herein, the implementation of the cable management arrangement 1000 is in no way limited to such an application. Rather, the cable management arrangement 1000 can be used in any application where it is desired to have a pre-determined length of cable removably adhered to a support sheet that itself can be adhered to a support surface.

As shown, the support sheet 1004 can be characterized as including a first portion 1004a, a second portion 1004b, and a third portion 1004c that are disposed at non-zero angles to each other, thus requiring the cables to be bent or curved as they transition from one portion to another. The first portion 1004a is shaped to match the general shape of the splice tray 112, and is provided with adhesive 1012 on the second side 1008 to allow the first portion 1004a to be adhered to the bottom side of the splice tray 112. The protective sheet 1014 is also shaped to match the first portion 1004a.

Referring to FIGS. 2, 7, 9, and 11, the adhesive 1012 and protective sheet 1014 can be seen as being generally present at a peel off area 1005 where the cables 1002 can be peeled away from the support sheet 1004. At this area, the cables 1002 can be attached to the support sheet 1004 as previously described and as shown at FIGS. 3 and 3A. At areas where it is not desired that the cables 1002 can be peeled away from the support sheet 1004, such as at portions 1004b, 1004c, a second sheet 1016 may be added to cover the cables 1002, as shown at FIG. 3B. In such an arrangement, an adhesive 1010 can be utilized to secure the sheets 1004 and 1016 together against the cables 1002. At such locations, the adhesive 1012 and protection sheet 1014 can be provided, if desired. Alternatively, the adhesive and protection sheet can be excluded from the construction as is the case at least for the second portion 1004b. Once a cable 1002 is peeled from the sheet 1004 and reaches the location at which the second sheet 1016 is disposed (e.g. at the second portion 1004b), the cable 1002 is prevented from being further removed by the second sheet 1016. The second sheet 1016 also imparts additional stiffness to the resulting cable ribbon. The thickness and materials of the sheets 1004 and 1016 can be selected to achieve a desired stiffness and/or other properties.

The first portion 1004a can also be provided with an aperture 1004d at which the second end 1002f of the cables 1002 reside which allows the second ends 1002f to be free from adhesive. This configuration provides a manual location for starting the removal of the cable 1002 from the support sheet 1004 and also ensures that the adhesive 1012 does not interfere or otherwise damage the ends 1002f. As can be seen, the second end 1002f is fanned out such that the cables 1002 have a slightly wider spacing between them. This construction allows for the selected cables 1002 to be individually peeled from the support sheet, if desired.

Figure 15:
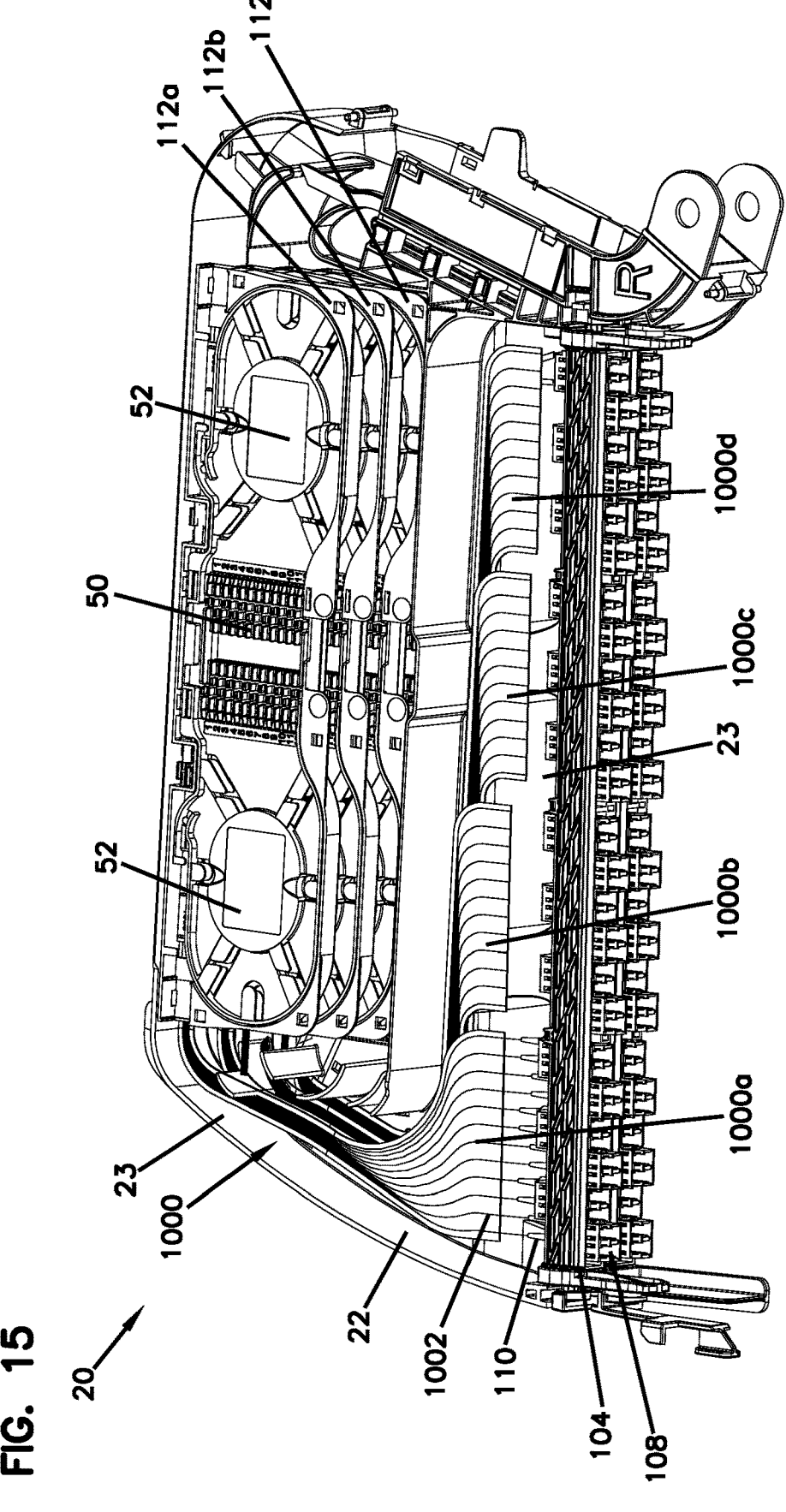
FIG. 15 is a front perspective view of an exemplary multi-positionable tray assembly usable with the telecommunications panel shown in FIG. 12 and including multiples of the cable management arrangements shown in FIGS. 1-2 and 6-10.
Figure 17:
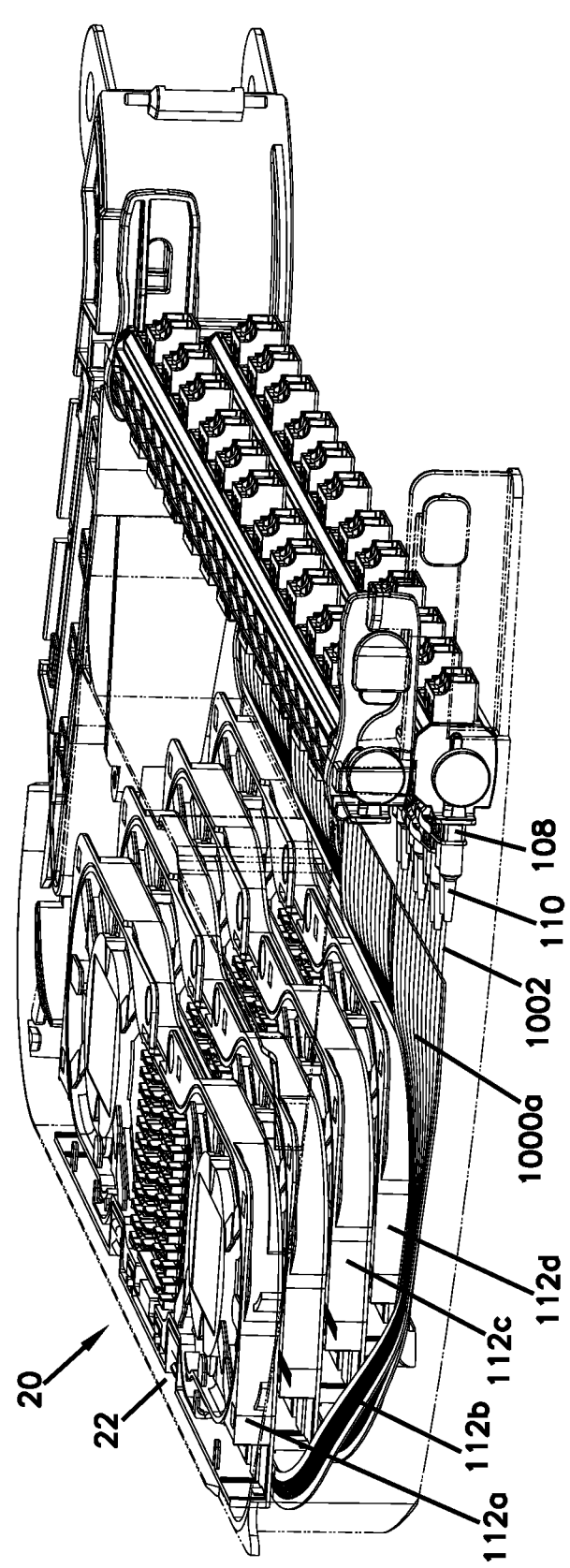
FIG. 17 is a side perspective view of the tray assembly shown in FIG. 15 with portions of the tray not shown to further illustrate the interior components of the tray assembly.

The cables 1002 disposed on the first portion 1004a of the support sheet 1004 are arranged adjacent to each other and are provided in a looped or coiled fashion such that a desired length of the cables 1002 can be stored on the first portion 1004a. As shown, the cables 1002 are looped or coiled twice proximate the perimeter edge of the first portion 1004a. The cables 1002 can be peeled from the first portion 1004a by their second ends 1004b, which allows the cables 1002 to be routed over to the splice holders 50 on the top side of the splice tray 112 (see FIG. 15). The remaining loose portion of the cables 1002 can be held at storage locations 52 on the splice tray 112. In one example, the stored length of each cable 1002 on the first portion 1004a is about 2 meters, wherein any length up to that amount can be peeled away from the sheet 1004. In many applications, at least one meter will be removed from the sheet 1004 to allow for enough length to perform a splicing or other action. As stated previously, the cables 1002 can be adhered to each other 1002 such that all of the cables can be removed from the support sheet 1004 individually or together as a ribbon and subsequently peeled from the ribbon if removed together.

The second portion 1004b of the support sheet 1004 provides for a routing pathway for the cables 1002 which brings the cables 1002 from the splice tray 112 towards the adapters 108 to which the cables 1002 will connect. Accordingly, the cables 1002 are disposed in relatively close proximity to each other on the second portion 1004b and the second portion 1004b is relatively narrow. The third portion 1004c provides a fan out region such that the cables 1002 can be separated from each other sufficiently to allow for the connectors 110 to be installed and to allow for alignment between the connectors 110 and the adapters 108 to which they are configured to connect. Although the support sheet 1004 is shown as having specifically shaped first, second, and third portions 1004a, 1004b, 1004c, the support sheet 1004 can be given any shape to suit a particular application.

FIGS. 6-11 show three additional arrangements of the cable management arrangement 1000 in which the second portion 1004b of the support sheet 1004 is provided at different lengths to route the cables 1002 to different locations within the support tray 22. For ease of reference, the arrangement of FIGS. 1 and 2 can be referred to as cable management arrangement 1000a, the arrangement of FIGS. 6 and 7 can be referred to as cable management arrangement 1000b, the arrangement of FIGS. 8 and 9 can be referred to as cable management arrangement 1000c, and the arrangement of FIGS. 10 and 11 can be referred to as cable management arrangement 1000d. As stated previously, many other arrangements are possible.

Telecommunications Panel-General

Figure 12:
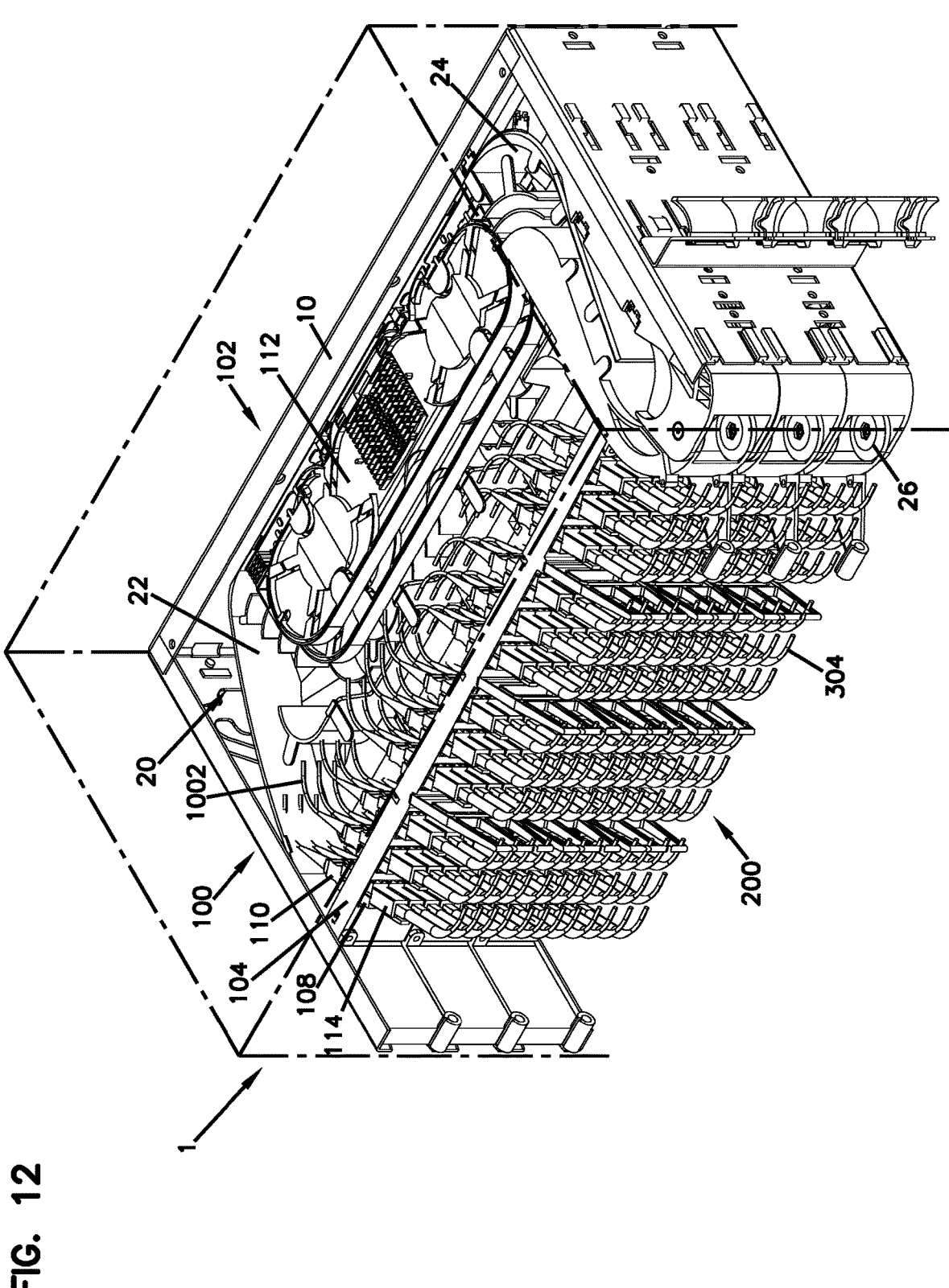
FIG. 12 is a perspective view of an example telecommunications panel including a plurality of multi-positionable tray assemblies in accordance with principles of the present disclosure.

Referring to FIG. 12, a telecommunications panel 100 (e.g., an enclosure, an optical distribution frame, etc.) is illustrated according to the principles of the present disclosure, within which the disclosed cable management arrangement 1000 may be utilized. As further illustrated at FIG. 1, the telecommunications panel 100 may be included in a cabinet 200 of a telecommunications system 1. The telecommunications panel 100 and/or the cabinet 200 may be used for various purposes in telecommunications systems and may include a chassis 10 to which a plurality of stacked multi-positionable tray assemblies 20 may be removably attached. In one aspect, the multi-positionable tray assembly 20 includes a support tray 22 (e.g., a sub-rack) and a support arm 24 that are pivotally connected to each other via a pivot joint 26 that allows the tray assembly 20 to be moved between a folded position and an access position.

Figure 13:
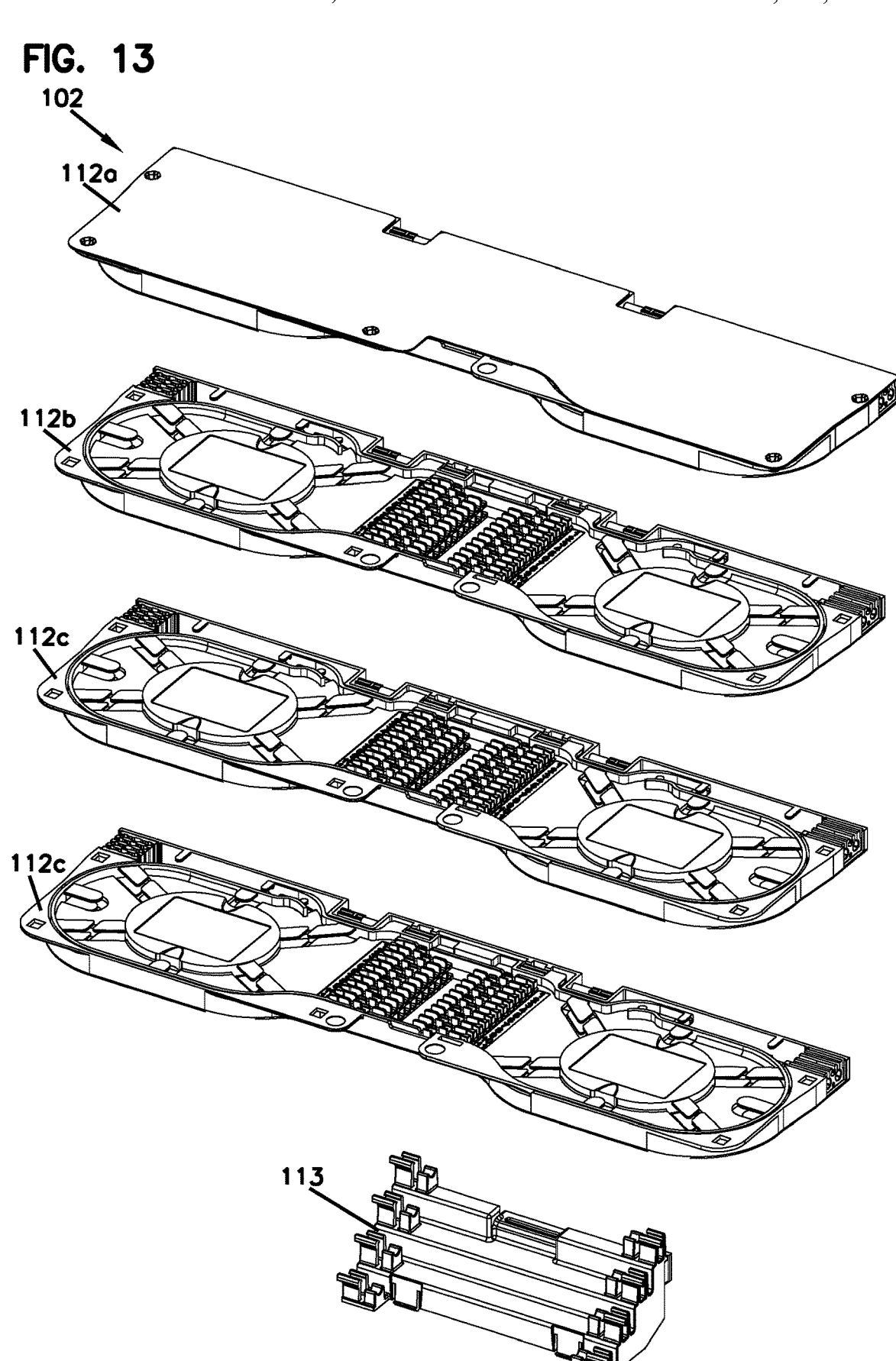
FIG. 13 is an exploded view of a cable management structure usable within the tray assembly shown in FIG. 12.
Figure 14:
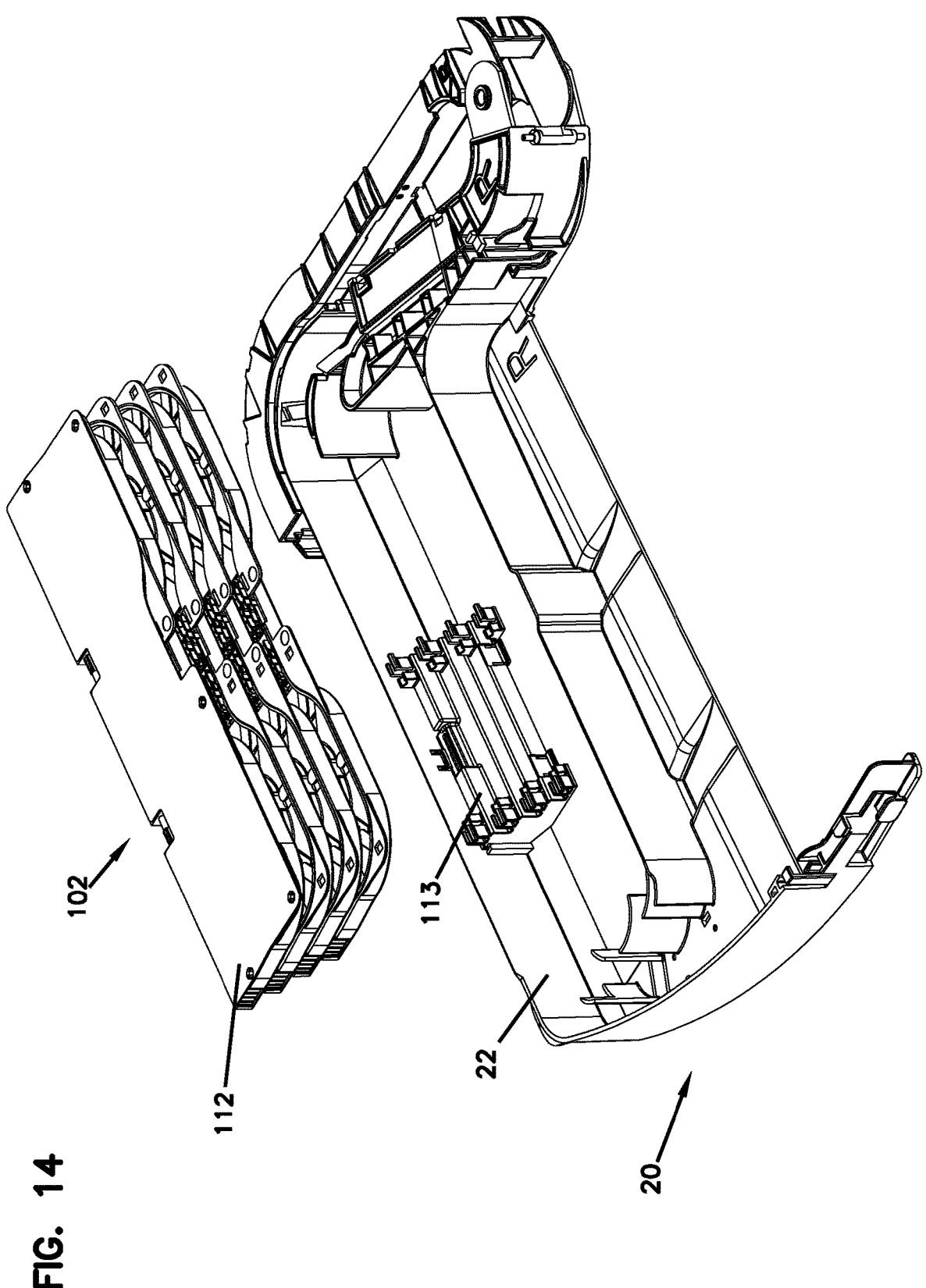
FIG. 14 is a view of the cable management structure shown in FIG. 13 aligned with a tray of the multi-positionable tray assembly shown in FIG. 12.

In the example shown, the support tray 22 houses a cable management structure 102 including, for example, stacked splice trays 112 and a patch panel 104. Referring to FIGS. 13 and 14, one example of a snap-fit cable management structure 102 is shown which includes a plurality of splice trays 112 (112a, 112b, 112c, 112d) that are snap-fit and pivotally mounted to a base structure 113 which is in turn snap-fit into a tray 22. Other arrangements are possible, for example, trays 112 may be splitter trays.

In one aspect, patch cords 1002 (shown schematically) of the cable management arrangement 1000 and patch cords 304 (i.e., patch cables, connectorized fiber optic cables, etc.) may enter the telecommunications panel 100 and/or the cabinet 200 and be interconnected at the patch panel 104. The patch panel 104 may include a plurality of fiber optic adapters 108. Fiber optic connectors 110, 114 that terminate ends of the patch cords 1002, 304 may connect with the fiber optic adapters 108 of the patch panel 104. The interconnections at the patch panel 104 may be rearranged from time-to-time, as desired, for changing configurations of the telecommunications system. The telecommunications panel 100 may further hold splitters, filters, and various other telecommunications components. An exemplary telecommunications system 1 is shown and described in U.S. Provisional Patent Application 62/051,093, filed on Sep. 16, 2014 and in Patent Cooperation Treaty Application PCT/EP2015/071196, filed on Sep. 16, 2015, the entireties of each being incorporated by reference herein.

Example Tray 22

Referring to FIGS. 15-20, an example telecommunications tray assembly 20 is presented which utilizes each of the cable management arrangements 1000a, 1000b, 1000c, 1000d for a corresponding splice tray 112a, 112b, 112c, 112d in a tray 22 of a tray assembly 20. For the purpose of clarity, only the cable management arrangement 1000a is shown with cables 1002 extending beyond the support sheet 1004 with attached connectors 110. In an actual installation, each of the cable management arrangements 1000a-1000d could be connectorized, although it is entirely possible to provide the arrangements without connectors, as shown.

Figure 18:
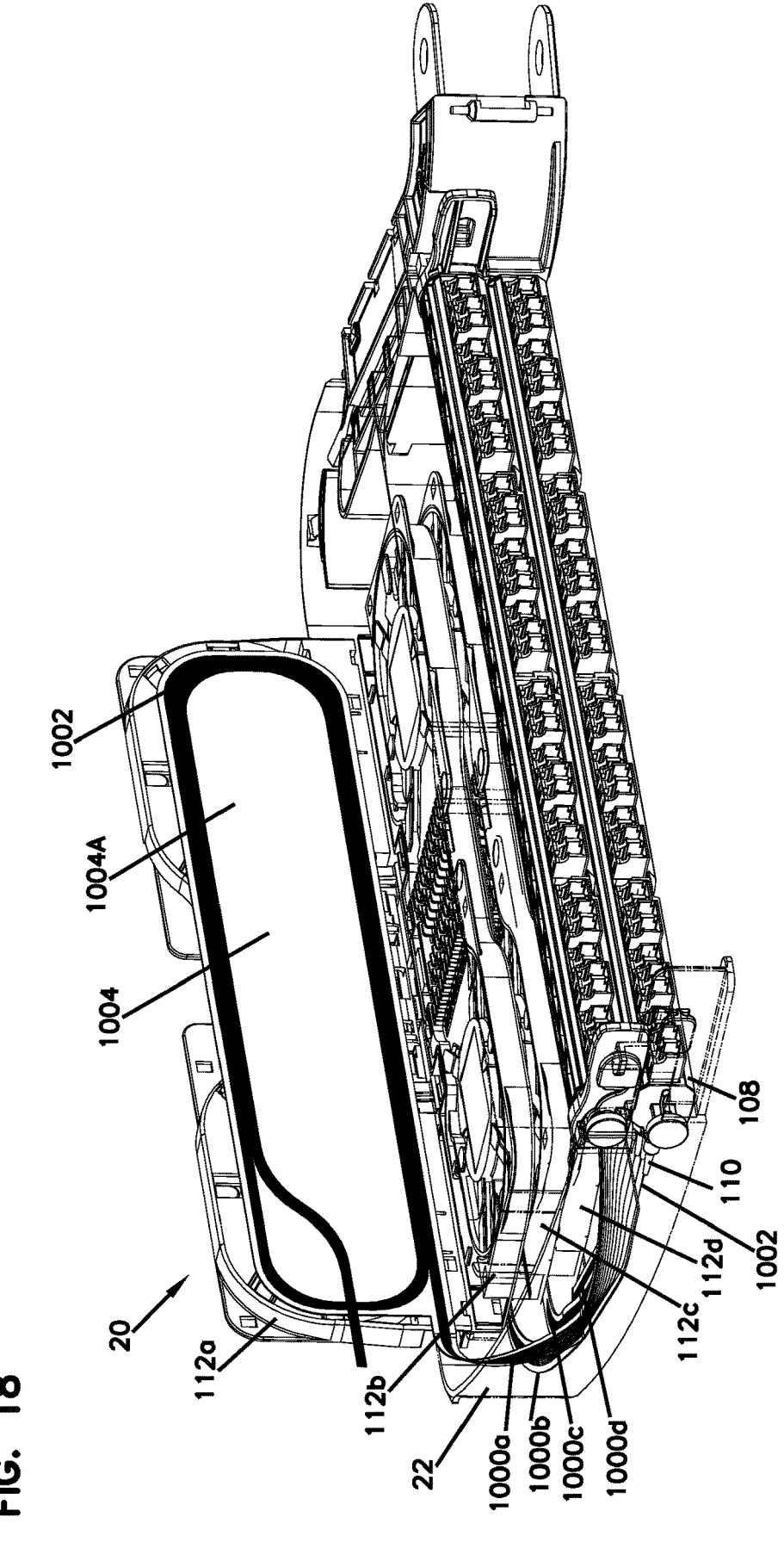
FIG. 18 is a front left perspective view of the tray assembly shown in FIG. 15 with a splice tray of the tray assembly shown in a raised position.
Figure 19:
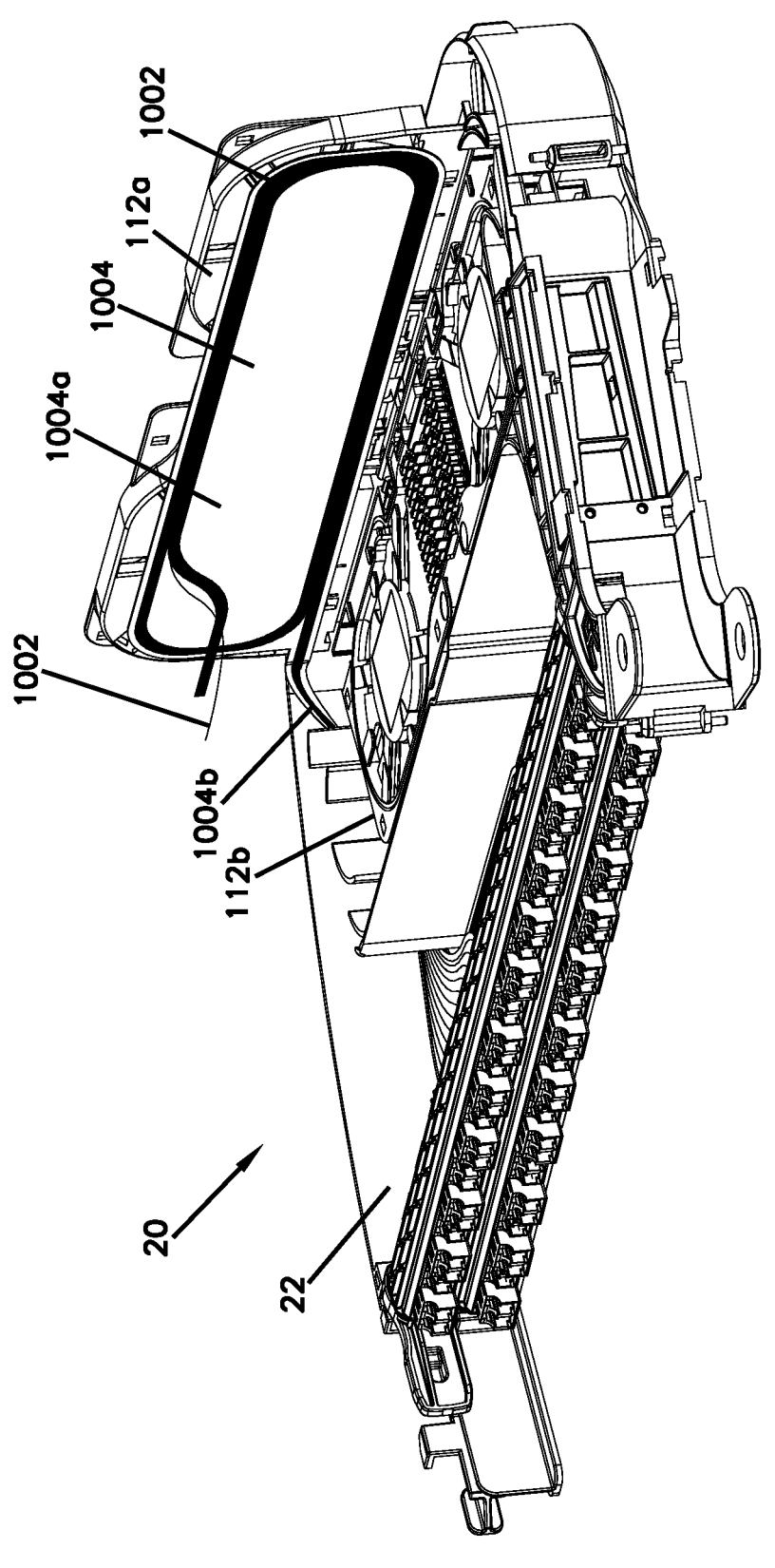
FIG. 19 is a front right perspective view of the tray assembly shown in FIG. 15 with a splice tray of the tray assembly shown in a raised position.

As most easily seen at FIGS. 18 and 19, it can be seen that the support sheet first portion 1004a of the cable management arrangement 1000a is adhered to the bottom surface of the splice tray 112a via the adhesive 1012. Although an adhesive connection is shown, attachment may be via a fastener system (e.g. clamping, bolting, clips, screws, slots that receive the support sheet edges, etc.). The cable management arrangements 1000b, 1000c, and 1000d are similarly attached to the respective splice trays 112b, 112c, and 112d. This arrangement, in which each individual cable 1002 is adjacent to other cables 1002 (i.e. not bundled over other cables) provides for a very flat configuration which can easily fit between the trays 112a-112d without causing additional bulk or requiring additional clearances.

Each of the support sheet second portions 1004b extends into and along a side channel 23 defined within the tray 22 in a direction towards the adapters 108. The second portions 1004b at this location serve as a bending or hinge point for the cables 1002 when the respective tray 112 is opened and closed. The support sheet 1004 is provided with enough flexibility to enable this function, but with enough stiffness to prevent undue bending or kinking of the cables 10002. The support sheet second portions 1004b further extend laterally over from the side channel 23 into a front area 25 defined between the trays 112 and adapters 108. As can be readily seen at FIGS. 16-18, the cable support sheet second portions 1004b are disposed over each other in a flat arrangement.

The support sheet second and third portions 1004b, 1004c are together arranged to allow the connectors 110 associated with the cable management arrangement 1000 to be aligned with the adapters 108 to which they can be attached. This configuration ensures that sufficient alignment is achieved such that the cables 1002 do not have to bend sharply to accommodate the connectors 110 attaching to the adapters 108. Additionally, and as mentioned previously, the routing of the cables 1002 on the support sheet 1004 is controlled to prevent the cables 1002 from being exposed to sharp bends or kinking that may damage the cables 1002. The third portion 1004*c* in particular minimizes required bending of the cables 1002 by spreading out the cables 1002 such that each individual cable 1002 aligns with an individual adapter 108, to the extent possible.

The disclosed approach of utilizing the cable management arrangements 1000*a*-1000*d* allows for the cables 1002 from one tray 112*a*-112*d* to be routed to the adapters 108 without the potential entanglement from cables 1002 associated with the other trays. Additionally, the disclosed arrangement results in a flattened cable arrangement and therefore requires less space within the tray 22 for cable routing. Yet another advantage of this arrangement is that the cables 1002 associated with a particular tray 112*a*-122*d* can be easily removed from the tray 22 without interference from the cables 1002 associated with the other trays 112*a*-112*d*. These are significant improvements over prior art arrangements in which individual cables extend from the trays 112*a*-112*d* to the adapters 108 in a general bundle where the likelihood of entanglement is increased and separation and identification of particular cables can be time consuming and cumbersome.

Figure 20:
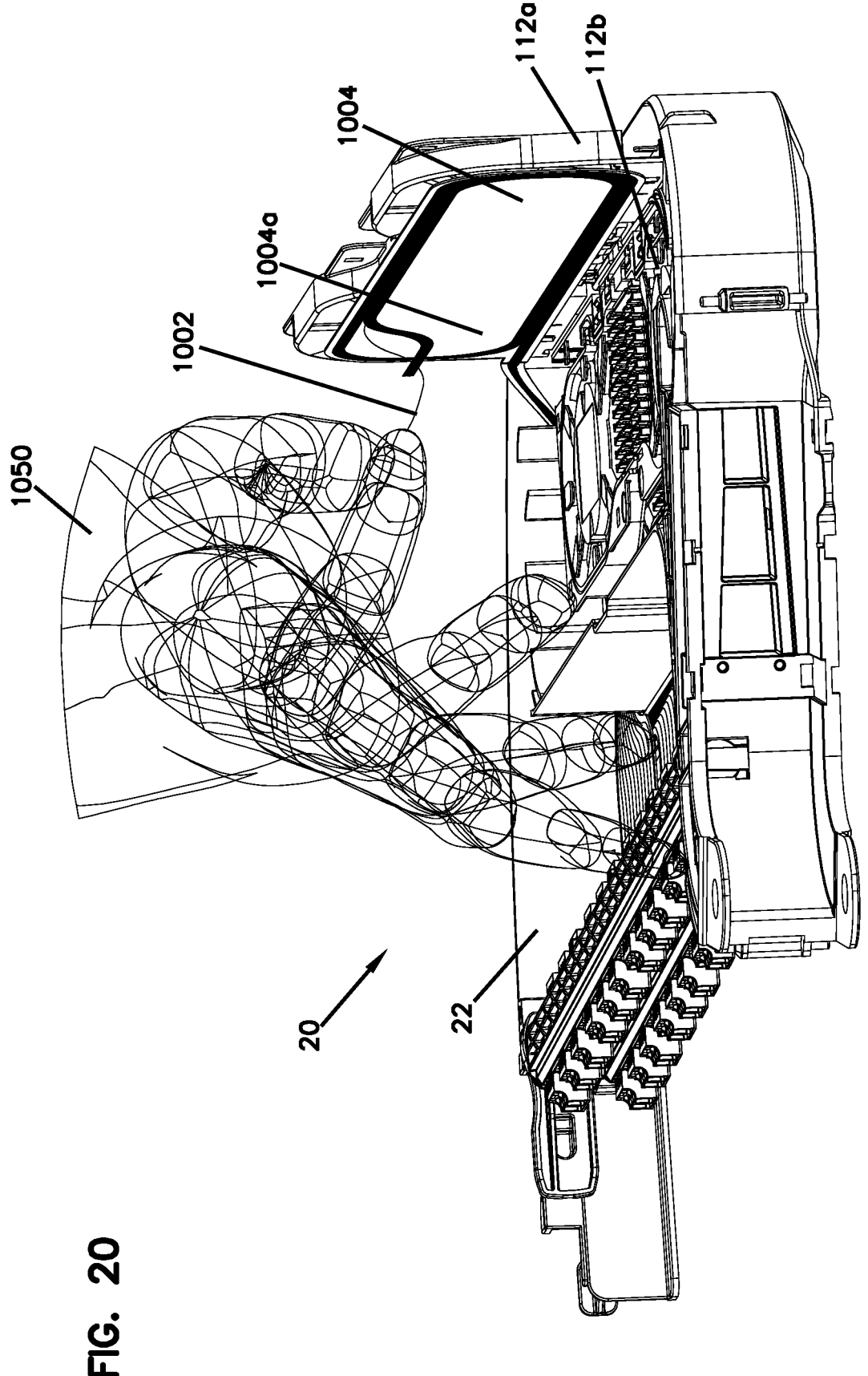
FIG. 20 is a front right perspective view of the tray assembly shown in FIG. 15 with a splice tray of the tray assembly shown in a raised position and showing an operator removing a single cable from the cable management arrangement.

Still referring to FIGS. 19 and 20, it can be seen that a user 1050 can selectively remove an individual cable 1002 from the stored cables 1002 below the tray 112 and peel as much of the cable from the tray 112 as desired. This partially removed cable 1002 can then be routed to the top side of the tray 112 where it can be spliced with another cable or telecommunications component and mounted to the tray 112. This feature not only allows for the previously mentioned storage benefits, but also allows for cables 1002 to reside beneath the trays 112 until they are actually needed so that additional connections can be made when needed without requiring the installation of additional cable. In one example, a tray 112, or other telecommunications component, can be provided with a factory mounted cable management arrangement 1000. The cables 1002 of such a configuration could also be connectorized with connectors 110, which would allow an installer to simply identify a tray and cable management arrangement 1000 combination that suits a particular purpose and then install the combination as a single unit. This approach can result in significant installation cost savings whether it occurs within the factory or in the field.

While this invention has been particularly shown and described with references to preferred embodiments thereof, it will be understood by those skilled in the art that various changes in form and details may be made therein without departing from the scope of the invention encompassed by the appended claims. The drawings are not necessarily to scale, emphasis instead being placed upon illustrating the principles of the invention and other modifications within the scope. Any such modifications or variations that fall within the purview of this description are intended to be included therein as well. It is understood that the description herein is intended to be illustrative only and is not intended to be limitative.

LIST OF REFERENCE NUMERALS AND
CORRESPONDING FEATURES

1 telecommunications system
10 chassis
20 multi-positionable tray assembly
22 support tray
50 holding area
52 storage area
100 telecommunications panel
102 cable management structure
104 patch panel
108 fiber optic adapters
110 first fiber optic connectors
112 splice tray
112*a* splice tray
112*b* splice tray
112*c* splice tray
112*d* splice tray
200 cabinet
304 patch cord
1000 cable management arrangement
1000*a* cable management arrangement
1000*b* cable management arrangement
1000*c* cable management arrangement
1000*d* cable management arrangement
1002 cables
1002*a* jacket
1002*b* a strengthening layer
1002*c* an aramid cladding layer
1002*d* a buffer tube
1002*e* first end
1002*f* second end
1003 optical fiber
1003*a* core
1003*b* *cladding layer*
1003*c* coating/acrylate later
1003*d* jacket
1004 support sheet
1004*a* first portion
1004*b* second portion
1004*c* third portion
1006 first side
1008 second side
1010 first adhesive
1012 second adhesive
1014 protective sheet
1016 second sheet

What is claimed is:

1. A cable management arrangement comprising:

(a) a plurality of cables extending between first and second ends, the second ends being connectorized, wherein a portion of the plurality of cables includes first cable portions that are adhered to each other to form a ribbon and includes second cable portions that are separated into individual cable portions;

(b) a supporting sheet having a first side and a second side, at least a portion of the plurality of cables having portions that are removably adhered to the supporting sheet first side by a first adhesive, wherein at least a length of the first cable portions are permanently secured to the support sheet;

(c) a second adhesive provided on at least a portion of the supporting sheet second side; and (d) a protection sheet covering the second adhesive, the protection sheet being removable from the supporting sheet to allow the supporting sheet to be adhered to a surface.

2. The cable management arrangement of claim 1, wherein the plurality of cables are fiber optic cables.

3. The cable management arrangement of claim 2, wherein a segment of each of the plurality of fiber optic cables extends beyond the first adhesive material to the connectorized second end such that at least a portion of the plurality of cables is unadhered to the supporting sheet.

4. The cable management arrangement of claim 1, wherein the supporting sheet defines at least one aperture.

5. The cable management arrangement of claim 4, wherein at least one of the plurality of cables extends to the at least one aperture.

6. The cable management arrangement of claim 1, wherein the first adhesive material covers only a portion of the supporting sheet.

7. The cable management arrangement of claim 1, wherein the first adhesive is a silicon-based adhesive.

8. The cable management arrangement of claim 1, wherein the supporting sheet is formed from a polymeric material.

9. The cable management arrangement of claim 1, wherein the supporting sheet is flexible.

10. The cable management arrangement of claim 1, wherein at least one end of the plurality of fiber optic cables extends beyond the supporting sheet.

11. The cable management arrangement of claim 1, wherein the supporting sheet defines an outer perimeter and at least a portion of the plurality of cables is routed along the outer perimeter.

12. The cable management arrangement of claim 1, wherein the supporting sheet includes a plurality of apertures for receiving fasteners.

13. The cable management arrangement of claim 1, wherein the plurality of cables are fiber optic cables including twelve connectorized fiber optic cables.

14. A cable management arrangement comprising:

(a) a plurality of cables extending between first and second ends; and (b) a supporting sheet having a first side, at least a first portion of the plurality of cables being removably adhered to the supporting sheet first side by a first adhesive, at least a second portion of the plurality of cables being permanently secured to the supporting sheet first side, (c) wherein the plurality of cables has a first portion, formed as a ribbon with the plurality of cables adhesively bonded to each other, and a second portion, formed as separated individual cables.

15. The cable management arrangement of claim 14, further comprising:

(a) a second adhesive provided on at least a portion of the supporting sheet second side; and (b) a protection sheet covering the second adhesive, the protection sheet being removable from the supporting sheet to allow the supporting sheet to be adhered to a surface.

16. The cable management arrangement of claim 14, wherein the plurality of cables are fiber optic cables.

17. The cable management arrangement of claim 16, further comprising a plurality of optical connectors provided on the first ends of the plurality of cables.

18. The cable management arrangement of claim 14, wherein the first adhesive is a silicone-based adhesive.

19. The cable management arrangement of claim 14, wherein the plurality of cables includes at least one power cable and at least one telecommunications cable.

20. The cable management arrangement of claim 14, further including a second sheet covering the second portion of the plurality of cables.

* * * * *